US009863089B2

United States Patent

Tutmark et al.

(12) United States Patent
(10) Patent No.: US 9,863,089 B2
(45) Date of Patent: Jan. 9, 2018

(54) METHOD FOR DYEING GOLF BALLS AND DYED GOLF BALLS

(71) Applicant: NIKE, Inc., Beaverton, OR (US)

(72) Inventors: Bradley C. Tutmark, Aloha, OR (US); Anna Schoborg, Beaverton, OR (US); Yihua Chang, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 53 days.

(21) Appl. No.: 13/786,043

(22) Filed: Mar. 5, 2013

(65) Prior Publication Data

US 2014/0250609 A1 Sep. 11, 2014

(51) Int. Cl.

| | |
|---|---|
| ***D06P 3/24*** | (2006.01) |
| ***D06P 3/52*** | (2006.01) |
| ***C08J 7/06*** | (2006.01) |
| ***D06P 3/26*** | (2006.01) |
| ***A63B 37/00*** | (2006.01) |
| ***A63B 45/02*** | (2006.01) |
| ***C08J 7/04*** | (2006.01) |

(52) U.S. Cl.

CPC ............ *D06P 3/24* (2013.01); *A63B 37/0022* (2013.01); *A63B 45/02* (2013.01); *C08J 7/042* (2013.01); *C08J 7/06* (2013.01); *D06P 3/26* (2013.01); *D06P 3/52* (2013.01); *C08J 2375/06* (2013.01); *C08J 2475/02* (2013.01); *C08J 2477/02* (2013.01)

(58) Field of Classification Search

CPC ..... D06P 3/24; D06P 3/52; D06P 3/26; A63B 37/0022; A63B 45/02; C08J 7/042; C08J 7/06; C08J 2375/06; C08J 2477/02; C08J 2475/02

See application file for complete search history.

(56) References Cited

U.S. PATENT DOCUMENTS

| | | | | |
|---|---|---|---|---|
| 3,994,872 | A | 11/1976 | Kuster | |
| 4,935,033 | A | 6/1990 | Mosimann et al. | |
| 4,964,875 | A | 10/1990 | Hendricks et al. | |
| 7,022,170 | B2 | 4/2006 | Taguchi et al. | |
| 7,387,821 | B2 | 6/2008 | Isogawa et al. | |
| 8,905,865 | B2 | 12/2014 | Tachibana | |
| 2004/0066438 | A1* | 4/2004 | Taguchi et al. | 347/100 |
| 2004/0142765 | A1* | 7/2004 | Kennedy et al. | 473/351 |
| 2004/0176188 | A1 | 9/2004 | Morgan et al. | |
| 2006/0050095 | A1 | 3/2006 | Kakuno et al. | |
| 2007/0256255 | A1* | 11/2007 | Witman et al. | 8/506 |
| 2010/0087275 | A1 | 4/2010 | Isogawa et al. | |
| 2011/0173762 | A1* | 7/2011 | Tutmark | 8/445 |
| 2011/0206850 | A1* | 8/2011 | Smith | 427/282 |
| 2012/0122614 | A1 | 5/2012 | Iizuka et al. | |
| 2014/0072442 | A1* | 3/2014 | Bowman et al. | 416/241 R |

FOREIGN PATENT DOCUMENTS

| | | | |
|---|---|---|---|
| CN | 201058208 | Y | 5/2008 |
| CN | 202113551 | U | 1/2012 |
| CN | 102526991 | A | 7/2012 |
| EP | 2365125 | A1 | 9/2011 |
| EP | 2402062 | A1 | 1/2012 |
| JP | S58112567 | A | 7/1983 |
| JP | S58143769 | A | 8/1983 |
| JP | H07173421 | A | 7/1995 |
| JP | 2004180921 | A | 7/2004 |
| JP | 2006115946 | | 5/2006 |

OTHER PUBLICATIONS

How to Dye Golf Balls by James McCluer May 6, 2008 https://www.youtube.com/watch?v=3hUP95q2pQA.*

Written Opinion and International Search Report PCT/US2014/014572 dated May 15, 2014.

RIT, Dyed Golf Balls, http://www.ritdye.com/diy-projects/odds-ends/dyed-golf-balls.

Database WPI Week 198340 1-9, 12-15 1,12 INV. A63645/00 A63837/00 1983 Thomson Scientific, London, GB; AN 1983-779719 XP002761197, -& JP S58 143769 A (SANTORBA KK) Aug. 26, 1983 (Aug. 26, 1983).

Anonymous: "Looking for a fluorescent yellow acid dye for golf balls", Feb. 11, 2012 (Feb. 11, 2012), XP055298056, Retrieved from the Internet: URL:http://www.pburch.net/dyeing/dyeblog/C A638 1134262190/E20120211093914/index.html DO6P [retrieved on Aug. 26, 2016].

Deborah Taylor: "How to Dye Golf Balls I Made Man", May 14, 2010 (May 14, 2010), XP055298073, Retrieved from the Internet: URL:http://www.mademan.com/mm/how-dye-golf-balls.html [retrieved on Aug. 26, 2016].

European Search Report dated Sep. 20, 2016 for European Patent Application No. 14760428.4, 11 pages.

U.S. Appl. No. 13/786,056, filed Mar. 5, 2013, Anna Schoborg.

U.S. Appl. No. 13/786,031, filed Mar. 5, 2013, Bradley C. Tutmark.

* cited by examiner

*Primary Examiner* — Amina Khan

(74) *Attorney, Agent, or Firm* — Shook, Hardy & Bacon L.L.P.

(57) ABSTRACT

A golf ball of a first color is dyed to a second color with an anionic or nonionic disperse dye. Either or both of a pigmented coating layer or an optional clear coating layer on the pigmented coating layer comprises a member selected from the group consisting of polyurethanes, polyureas, polyamides, and combinations thereof, which can be dyed by the anionic or nonionic disperse dye.

20 Claims, 1 Drawing Sheet

METHOD FOR DYEING GOLF BALLS AND DYED GOLF BALLS

FIELD OF THE INVENTION

The invention is related to methods of dyeing golf balls and to the dyed golf balls produced by those methods.

INTRODUCTION TO THE DISCLOSURE

This section provides background information related to this disclosure but which may or may not be prior art.

Zhao et al., U.S. Pat. Nos. 5,938,828 and 5,948,152 disclose complexes of anionic organic dyes with quaternary ammonium compounds, particularly with alkoxylated moieties. Unwanted salts formed from the cations of the dye and counter-ions are removed to obtain a dyeing agent that easily disperses within different media and possesses favorable non-migration and coloring characteristics. The examples disclosed include a complex of acid red with dicoco dimethyl ammonium chloride; a complex of direct blue with ditallow dimethyl ammonium chloride; and complexes of direct blue, acid red, acid yellow, and quinoline yellow with methyl bis[polyethoxy (15) ethanol]coco ammonium chloride.

Various patents disclosing novel anionic dyes, for example Benguerrel, U.S. Pat. No. 4,384,870; Uehlinger, U.S. Pat. No. 4,466,920; Schoefberger, U.S. Pat. No. 5,354,849; and Benguerrel, Swiss Patent CH 635 361 generally disclose anionic dyes with various counterions and mention polyurethane textiles as substrates that can be dyed with the anionic dyes.

Acid dyes are generally used to dye protein fibers such as wool and silk and to dye polyamide (nylon) fibers. Acid dyes are known to have less success dyeing other materials. For instance, Haerri et al., WO 2011/035533 describes dyeing textile blends of polyamide and elastane (also known as spandex and which has both urethane and urea linkages) fibers by adding a combination of a betaine, quaternary ammonium salt, and alkoxylated fatty alcohol as a shade enhancing agent to the dye liquor to diminish the shade difference between the polyamide and elastane fibers. B. H. Patel et al., "Dyeing of polyurethane fibre with acid dyes," The Indian Textile Journal (Sep. 2009) notes shortcomings in colorfastness.

Clothing, accessories, or athletic equipment are often a source of expression for the athlete. The clothing, accessories, or athletic equipment may be colored or marked to provide an association with an event, team, or business, coordinate with another item, or provide the owner or user with an attractive or customized item.

Golf balls are typically produced in white and possible one or two other colors (e.g., yellow). Generally, customization of golf balls is limited to printing desired words, logos, or designs on balls. It is expensive to produce golf balls with customized pigment-colored covers in short runs, and the differently colored covers prevents scrap cover material from being reused for other balls, although this may sometimes be done. It is often necessary to color the core and any interior layers white to obtain a true color for the custom color of the cover. Further, the cover layer material is compounded with a color masterbatch or powdered pigment, and thus the cover contains the pigment throughout its thickness even though only pigment very near the cover surface is visible. Most of the pigment included is unnecessary and, depending on the pigment, may add significant expense. Finally, changing from a colored cover back to a white cover necessitates extensive, careful cleaning of the equipment (e.g., an injection barrel of an injection molding machine) to avoid color contamination of the standard white ball covers.

SUMMARY OF THE DISCLOSURE

This section provides a general summary of what this specification discloses.

In a disclosed method, a golf ball that has a pigmented coating layer of a first color and optionally a clear coating layer over the pigmented coating layer, with at least one of the pigmented coating layer and the clear coating layer comprising at least one of polyurethane, polyurea, and polyamide (including blends and copolymers of these) is dyed a second color with an acid or nonionic disperse dye. The second color is different from the first color. By "different" is meant that the first color and the second color each have a different set of color coordinates L*, a*, b*, as obtained spectrophotometrically. The first color may be, for example, a solid color such as white or a metallic or pearlescent color such as a silver metallic or a white pearl. White, silver metallic, and white pearl colors provide dyed second colors that are truest to the dye selected, but other first colors, particularly light colors such as a light yellow, can be used to create a different color with the dye. In one example, a golf ball has a pigmented coating layer of a first color and either the pigmented coating layer or a clear coating layer over the pigmented coating layer is dyed a second color with an acid or nonionic disperse dye; the dyed pigmented coating layer or clear coating layer comprises at least one of polyurethane, polyurea, and polyamide in an amount sufficient for the pigmented coating layer or clear coating layer to be dyed by the acid or nonionic disperse dye. The dyed layer (pigmented coating layer or clear coating layer) gives the golf ball a color different from the first color. For example, a white golf ball may be dyed a shade of yellow, red, blue, green, purple, and so on; a silver metallic ball may be dyed a red metallic, blue metallic or green metallic color by dyeing with a red, blue, or green anionic or nonionic disperse dye. The phrase "polyurethane, polyurea, and polyamide" as used in this description includes not only polyurethane, polyurea, and polyamide polymers themselves but also blends and copolymers of these with one another and thermoset materials prepared from any of these.

In one aspect, the golf ball has a pigmented coating layer or clear coating layer that is dyed that includes polyurethane, polyurea, or polyamide, but particularly includes polyurethane or polyurea, and especially polyurethane. While in general acid dyes, also known as anionic dyes, do not dye polyurethane materials well under mild dyeing conditions, only lightly tinting the polyurethane materials, addition of particular ammonium salts to the dye solution increases affinity of the acid dye molecules toward the polyurethane materials to provide intensely colored products with good colorfastness. Accordingly, in this aspect of the invention, the golf ball having a pigmented coating layer or clear coating layer comprising polyurethane, polyurea, or polyamide, but particularly comprising polyurethane or polyurea, and especially comprising polyurethane, is dyed in an aqueous dye solution that includes an anionic dye compound, a quaternary ammonium salt selected from soluble tetrabutylammonium compounds and tetrahexylammonium compounds, and, optionally, a water-soluble organic solvent. The tetraalkylammonium compound may be, for example, a halide, hydroxide, sulfate, carboxylate, carbonate or other salt soluble in the aqueous dye solution. By "soluble"

tetraalkylammonium compounds it is meant that the tetraalkylammonium compound is at least partially, preferably fully, soluble in aqueous dye solution at the temperature at which dyeing is carried out. Both the pigmented coating layer having the first color and a clear coating layer over the pigmented coating layer may include polyurethane, polyurea, or polyamide (and in a preferred embodiment comprising polyurethane or polyurea, or particularly comprising polyurethane) and both may be dyed in the process. The aqueous dye solutions and processes provide surprisingly deeper, richer colors and better colorfastness used with polyurethane materials, polyurea materials, and polyurethane/polyurea blends and copolymers.

In another aspect of the invention, a process for dyeing golf balls includes contacting a golf ball having a pigmented coating layer of a first color and, optionally, a clear coating layer, at least one of the pigmented coating layer and the clear coating layer comprising at least one of polyurethane, polyurea, and polyamide, with an aqueous dye solution, for example by immersing the golf ball in the aqueous dye solution or by applying the aqueous dye solution to the golf ball, for a time and at a temperature sufficient for the anionic or nonionic disperse dye compound to color the pigmented coating layer or clear coating layer. In various embodiments, a part less than all of the pigmented coating layer or clear coating layer is dyed, for example by immersing only a part of the golf ball in the aqueous dye solution or by masking a portion to not permit penetration of the dye before immersing the golf ball in the aqueous dye solution or otherwise applying the aqueous dye solution to the ball. Another portion of the golf ball may subsequently be dyed a third color.

In certain other embodiments a golf ball having a pigmented coating layer of a first color is provided with a partial clear coating layer comprising at least one of polyurethane, polyurea, and polyamide. The partial clear coating layer may be in the form a design or pattern on the surface of the golf ball pigmented coating layer. In various embodiments, the at least partial layer is applied in a coating process, e.g. sprayed, brushed, or roll coated onto an unmasked portion of the ball, or applied in a printing process, e.g. by pad printing. The partial layer is then dyed with an aqueous acid or nonionic disperse dye solution to a second color.

Using the disclosed methods, a golf ball of a first color can be manufactured, then customized at a later time to have a second color on all or a portion of its surface. Similarly, a golf ball that has a first color can be manufactured, then customized at a later time to have more than one color different from the first color on portions of its surface by masking and dyeing various areas of its pigmented coating layer or an optional clear coating layer over the pigmented coating layer. Golf balls having only white, silver metallic, or white pearl colors can be customized to a desired coloration in this way, while covers, cores, and inner layers can be colored or tinted as desired independently of a desired exterior coloration.

In one aspect, the pigmented coating layer comprises an aluminum pigment or a white pearlescent pigment or both.

In another aspect, both a clear coating layer and a pigmented coating layer on a golf ball is dyed with an acid or nonionic disperse dye.

In still another aspect a golf ball may have a pigmented coating layer of a first color that is dyed to second color before coating with a clear coating layer, for example for a glossy appearance or protection, or the ball may be dyed again after a clear coating is applied at a part of the pigmented coating layer or after a printed design is applied, e.g. by pad printing, with the clear coating asks as a mask to retain the second color in the coated areas while uncoated areas are dyed a third color.

The terms “acid dye” and “anionic dye” are used interchangeably throughout the description and claims.

“A,” “an,” “the,” “at least one,” and “one or more” are used interchangeably to indicate that at least one of the item is present; a plurality of such items may be present unless the context clearly indicates otherwise. All numerical values of parameters (e.g., of quantities or conditions) in this specification, including the appended claims, are to be understood as being modified in all instances by the term “about” whether or not “about” actually appears before the numerical value. “About” indicates that the stated numerical value allows some slight imprecision (with some approach to exactness in the value; approximately or reasonably close to the value; nearly). If the imprecision provided by “about” is not otherwise understood in the art with this ordinary meaning, then “about” as used herein indicates at least variations that may arise from ordinary methods of measuring and using such parameters. In addition, disclosure of ranges are to be understood as specifically disclosing all values and further divided ranges within the range.

The terms “comprising,” “including,” and “having” are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term “or” includes any one and all combinations of the associated listed items.

BRIEF DESCRIPTION OF THE DRAWINGS

The drawings illustrate some aspects of the disclosed technology.

DETAILED DESCRIPTION

Figure 1:
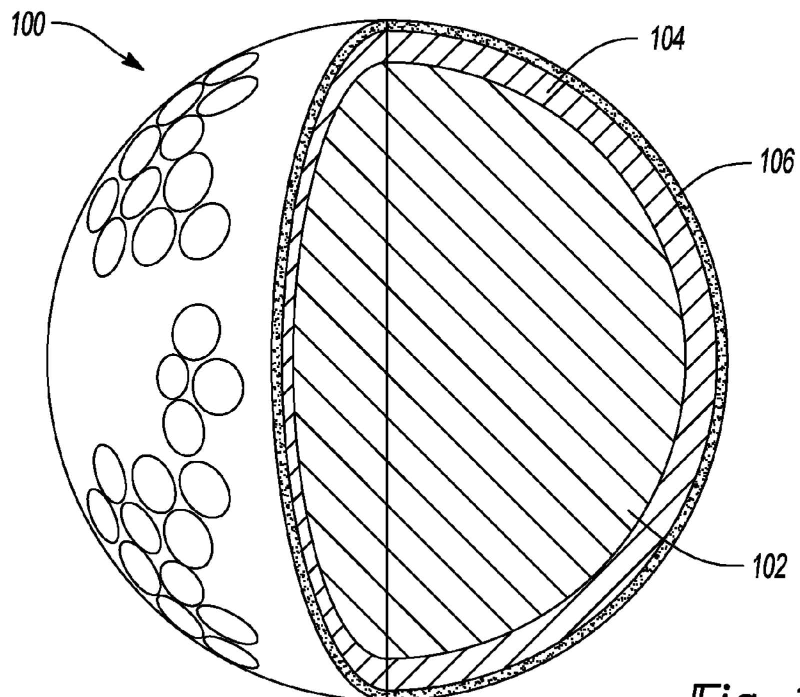
FIG. 1 illustrates one embodiment of a golf ball that is dyed.

This section provides specific examples intended to illustrate the invention that are not necessarily limiting as to materials and processes.

In the method, a pigmented coating layer of a first color or an optional clear coating layer over the pigmented coating layer has at least one of polyurethane, polyurea, and polyamide (including blends and copolymers of these) and is dyed with an acid or nonionic disperse dye.

Acid dyes are water-soluble anionic dyes. Acid dyes are available in a wide variety, from dull tones to brilliant shades. Chemically, acid dyes include azo, anthraquinone and triarylmethane compounds.

The “Color Index” (C.I.), published jointly by the Society of Dyers and Colourists (UK) and by the American Association of Textile Chemists and Colorists (USA), is the most extensive compendium of dyes and pigments for large scale coloration purposes, including 12000 products under 2000 C.I. generic names. In the C.I. each compound is presented with two numbers referring to the coloristic and chemical classification. The “generic name” refers to the field of application and/or method of coloration, while the other number is the “constitution number.” Nonlimiting examples of acid dyes include Acid Yellow 1, 17, 23, 25, 34, 42, 44, 49, 61, 79, 99, 110, 116, 127, 151, 158:1, 159, 166, 169, 194, 199, 204, 220, 232, 241, 246, and 250; Acid Red, 1, 14, 17, 18, 42, 57, 88, 97, 118, 119, 151, 183, 184, 186, 194, 195, 198, 211, 225, 226, 249, 251, 257, 260, 266, 278, 283, 315, 336, 337, 357, 359, 361, 362, 374, 405, 407, 414, 418, 419, and 447; Acid Violet 3, 5, 7, 17, 54, 90, and 92; Acid Brown 4, 14, 15, 45, 50, 58, 75, 97, 98, 147, 160:1, 161, 165, 191, 235, 239, 248, 282, 283, 289, 298, 322, 343, 349, 354, 355, 357, 365, 384, 392, 402, 414, 420, 422, 425, 432, and 434; Acid Orange 3, 7, 10, 19, 33, 56, 60, 61, 67, 74, 80, 86, 94, 139, 142, 144, 154, and 162; Acid Blue 1, 7, 9, 15, 92, 133, 158, 185, 193, 277, 277:1, 314, 324, 335, and 342; Acid Green 1, 12, 68:1, 73, 80, 104, 114, and 119; Acid Black 1, 26, 52, 58, 60, 64, 65, 71, 82, 84, 107, 164, 172, 187, 194, 207, 210, 234, 235, and combinations of these. The acid dyes may be used singly or in any combination in the dye solution.

Acid dyes are commercially available from many sources, including Dystar L.P., Charlotte, N.C. under the trademark TELON, Huntsman Corporation, Woodlands, Tex. under the trademarks ERIONYL and TECTILON, BASF SE, Ludwigshafen, Germany under the trademark BASACID, and Bezema AG, Montlingen, Switzerland under the trade name Bemacid.

Nonionic disperse dyes are available in many colors, including fluorescent colors.

The acid or nonionic disperse dye solution in which the golf ball is dyed may include, for example, from about 0.001 to about 5.0 g/L, preferably from about 0.01 to about 2 g/L of the acid or nonionic disperse dye compound or combination of acid or nonionic disperse dye compounds. The amount of acid or nonionic disperse dye compound use will determine how strong the color is of the dyed pigmented coating layer or dyed clear coating layer and how quickly the pigmented coating layer or clear coating layer is dyed, and may be optimized in a straightforward manner; generally, a more concentrated dye solution can provide a stronger (deeper, darker, more intense) dyed color and can more quickly dye the pigmented coating layer or clear coating containing polyurethane, polyurea, or polyamide.

The dye solution may include a water-soluble organic solvent. Water solubility of a particular organic solvent used in a particular amount in the dye solution is determined at 20° C. and 1 atm. pressure at the concentration at which the alcohol is to be used in the dye solution; the organic solvent is water soluble if it fully dissolves or is fully miscible in water at 20° C. and 1 atm. pressure at the concentration at which the alcohol is to be used in the dye solution and does not form any separate phase or layer. Suitable, nonlimiting examples of water-soluble organic solvents that may be used include alcohols, such as methanol, ethanol, n-propanol, isopropanol, ethylene glycol, diethylene glycol, triethylene glycol, tetraethylene glycol, propylene glycol, dipropylene glycol, tripropylene glycols, and glycerol; ketones, such as acetone and methyl ethyl ketone; esters, such as butyl acetate, which is soluble in limited amounts in water; and glycol ethers and glycol ether esters (particularly acetates), such as ethylene glycol monobutyl ether, propylene glycol monomethyl ether, and propylene glycol monomethyl ether acetate. The water-soluble organic solvent may be included in concentrations of up to about 50% by volume, or up to about 25% by volume, or from about 1% to about 50% by volume, or from about 5% to about 40% by volume, or from about 10% to about 30% by volume, or from about 15% o about 25% by volume of the aqueous medium used to make the dye solution. Whether an organic solvent is used and how much organic solvent is used may be varied according to which dye is used and to the application method for contacting the dye solution with the golf ball. For instance, no or a minimal amount of organic solvent may be included in a dye solution into which the golf ball is dipped in dyeing, while substantially more organic solvent may be included when the dye is sprayed or applied onto the golf ball in another way.

When the pigmented coating layer or clear coating layer to be dyed includes a material selected from polyurethanes, polyureas, and polyurethane/polyurea blends and copolymers or thermoset products of these, the anionic dye solution also advantageously includes a quaternary (tetraalkyl) ammonium salt selected from soluble tetrabutylammonium compounds and tetrahexylammonium compounds. A polyurethane- or polyurea-containing pigmented coating layer or clear coating layer may thus be dyed in an acid dye solution including an anionic dye compound, a quaternary ammonium salt selected from soluble tetrabutylammonium compounds and tetrahexylammonium compounds, and, optionally, a water-soluble organic solvent.

The counterion of the quaternary ammonium salt should be selected so that the quaternary ammonium salt forms a stable solution with the anionic dye. The quaternary ammonium compound may be, for example, a halide (such as chloride, bromide or iodide), hydroxide, sulfate, sulfite, carbonate, perchlorate, chlorate, bromate, iodate, nitrate, nitrite, phosphate, phosphite, hexyluorophosphite, borate, tetrafluoroborate, cyanide, isocyanide, azide, thiosulfate, thiocyanate, or carboxylate (such as acetate or oxalate). In certain embodiments, an anion that is a weaker Lewis base may be selected for the tetraalkylammonium compound to produce a darker color for the dyed pigmented coating layer or clear coating layer. In various embodiments, the tetraalkylammonium compound is or includes a tetrabutylammonium halide or tetrahexylammonium halide, particularly a tetrabutylammonium bromide or chloride or a tetrahexylammonium bromide or chloride.

The acid dye solution used to dye the pigmented coating layer or clear coating layer when it contains or they contain a polyurethane or polyurea may include from about 0.1 to about 5 equivalents of the soluble tetraalkylammonium compound per equivalent of dye compound. In various embodiments, the acid dye solution may include from about 0.5 to about 4, preferably from about 1 to about 4 equivalents of the tetraalkylammonium compound per equivalent of dye compound. The amount of tetraalkylammonium compound used with a particular acid dye compound depends upon the rate of diffusion of the dye into and in the pigmented coating layer or clear coating layer and may be optimized in a straightforward manner. The process of dyeing a polyurethane- or polyurea-containing pigmented coating layer or clear coating layer with the disclosed dye solution containing the soluble tetraalkylammonium compound can produce strong color intensity in the dyed pigmented coating layer or clear coating layer.

The pigmented coating layer or clear coating layer that is dyed includes a sufficient amount of one or more of the polyurethane, polyurea, and polyamide polymers to be dyed by the anionic or nonionic disperse dye. In some cases, the pigmented coating layer or clear coating layer may include only one or more of polyurethane, polyurea, and polyamide polymers and copolymers (including thermoset reaction products); in other cases, the pigmented coating layer or clear coating layer contains one or more polyurethane, polyurea, and polyamide polymers, copolymers, and blends as well as one or more different polymers. The pigmented coating layer or clear coating layer may include from about 20% to about 100% by weight, or from about 30% to about 100% by weight, or from about 50% to about 95% by weight of the combined polyurethane, polyurea, and polyamide polymers and copolymers based on total polymer weight in the pigmented coating layer or clear coating layer. In other embodiments, the pigmented coating layer or clear coating layer includes at least about 20% by weight, or at least about 30% by weight, or at least about 40% by weight, or at least about 50% by weight, or at least about 60% by weight, or at least about 70% by weight and up to about 90% by weight or up to about 95% by weight or up to about 100% by weight of the combined polyurethane, polyurea, and polyamide polymers and copolymers based on total polymer weight in the pigmented coating layer or clear coating layer.

In general terms, suitable polyurethanes include both thermoplastic and thermoset reaction products of one or more polyisocyanates and one or more polyols. A thermoplastic polyurethane results when all or substantially all of the reactants are difunctional (while careful addition of limited amounts of a trifunctional reactant may result in a branched thermoplastic polyurethane, optionally using a monofunctional reactant to help control branching) and no crosslinker or crosslinking agent is employed. A thermoset polyurethane may be obtained by using one or more trifunctional or higher functionality reactants in sufficient amount to obtain a crosslinked product or by crosslinking the polyurethane after polymerization through functionality on the polyurethane, e.g. by reacting terminal isocyanate or hydroxyl groups with a polyfunctional crosslinker or by inducing addition polymerization of ethylenic unsaturation of the polymer, for example as described in Ishii et al., US Patent Application Publ. No. 2012/0225738.

The polyisocyanate may be aromatic or aliphatic. Useful diisocyanate compounds for preparing thermoplastic polyurethanes include, without limitation, isophorone diisocyanate (IPDI), methylene bis-4-cyclohexyl isocyanate ($H_{12}$MDI), cyclohexyl diisocyanate (CHDI), m-tetramethyl xylene diisocyanate (m-TMXDI), p-tetramethyl xylene diisocyanate (p-TMXDI), 4,4'-methylene diphenyl diisocyanate (MDI, also known as 4,4'-diphenylmethane diisocyanate), 2,4- or 2,6-toluene diisocyanate (TDI), ethylene diisocyanate, 1,2-diisocyanatopropane, 1,3-diisocyanatopropane, 1,6-diisocyanatohexane (hexamethylene diisocyanate or HDI), 1,4-butylene diisocyanate, lysine diisocyanate, meta-xylylenediioscyanate and para-xylylenediisocyanate, 4-chloro-1,3-phenylene diisocyanate, 1,5-tetrahydro-naphthalene diisocyanate, 4,4'-dibenzyl diisocyanate, and xylylene diisocyanate (XDI), and so on. These may be used in any combination. In certain embodiments MDI may be a preferred diisocyanate. Nonlimiting examples of higher-functionality polyisocyanates that may be used in limited amounts to produce branched thermoplastic polyurethanes (optionally along with monofunctional alcohols) or in higher amounts to produce thermoset polyurethanes include 1,2,4-benzene triisocyanate, 1,3,6-hexamethylene triisocyanate, 1,6,11-undecane triisocyanate, bicycloheptane triisocyanate, triphenylmethane-4,4',4"-triisocyanate, isocyanurates of diisocyanates, biurets of diisocyanates, allophanates of diisocyanates, and isocyanate-functional compounds containing urethane, urea, carbodiimide, or uretdione groups. Polyisocyanates containing urethane groups, for example, may be obtained by reacting some of the isocyanate groups with polyols, such as trimethylolpropane, pentaerythritol, and glycerol, for example.

Nonlimiting examples of suitable diols and polyols that may be used include ethylene glycol and lower oligomers of ethylene glycol including diethylene glycol, triethylene glycol and tetraethylene glycol; propylene glycol and lower oligomers of propylene glycol including dipropylene glycol, tripropylene glycol and tetrapropylene glycol; cyclohexanedimethanol, 1,6-hexanediol, 2-ethyl-1,6-hexanediol, 1,4-butanediol, 1,5-pentanediol, 1,3-propanediol, butylene glycol, neopentyl glycol, dihydroxyalkylated aromatic compounds such as the bis(2-hydroxyethyl)ethers of hydroquinone and resorcinol; p-xylene-α,α'-diol; the bis(2-hydroxyethyl)ether of p-xylene-α,α'-diol; m-xylene-α,α'-diol and combinations of these. Thermoplastic polyurethanes may be made using small amounts of triols or higher functionality polyols, such as trimethylolpropane or pentaerythritol, optionally along with monomeric alcohols such as C2-C8 monools, while thermoset polyurethanes may be prepared using sufficient amounts of such triols or higher functionality polyols or polyisocyanates or both to provide a crosslinked product. Generally, aliphatic polyisocyanates and polyols may be used for better resistance to yellowing.

In various embodiments, the polyurethane may be or include a thermoplastic polyurethane elastomer. The thermoplastic polyurethane elastomer may be selected from thermoplastic polyester-polyurethanes, polyether-polyurethanes, and polycarbonate-polyurethanes, including, without limitation, polyurethanes polymerized using as diol reactants polytetrahydrofurans, polyesters, polycaprolactone polyesters, and polyethers of ethylene oxide, propylene oxide, and copolymers including ethylene oxide and propylene oxide. These polymeric diol-based polyurethanes may be prepared by reaction of a polymeric diol (polyester diol, polyether diol, polycaprolactone diol, polytetrahydrofuran diol, or polycarbonate diol), one or more polyisocyanates such as those already mentioned, and, optionally, one or more other chain extension compounds. Chain extension compounds, as the term is used herein, are compounds having two or more functional groups reactive with isocyanate groups, such as the polyols already mentioned. Preferably the polymeric diol-based polyurethane is substantially linear (i.e., substantially all of the reactants are difunctional) and may be crosslinked in producing the pigmented coating layer or the clear coating layer with a crosslinker such as a polyisocyanate.

The polyester diols used in forming a thermoplastic polyurethane are in general prepared by the condensation polymerization of one or more polyacid compounds and one or more polyol compounds. Preferably, the polyacid compounds and polyol compounds are di-functional, i.e., diacid compounds and diols are used to prepare substantially linear polyester diols, although minor amounts of mono-functional, trifunctional, and higher functionality materials (perhaps up to 5 mole percent) can be included to provide a slightly branched, but uncrosslinked polyester component. Suitable dicarboxylic acids include, without limitation, glutaric acid, succinic acid, malonic acid, oxalic acid, phthalic acid, hexahydrophthalic acid, adipic acid, maleic acid, their anhydrides and polymerizable esters (e.g., methyl esters) and salts (e.g., chlorides), and mixtures of these. Suitable polyols include those already mentioned, especially the diols. In a preferred embodiment, the carboxylic acid includes adipic acid, phthalic acid or maleic acid (or the anhydrides or polymerizable esters of these) and the diol includes 1,4-butanediol, 1,6-hexanediol, or diethylene glycol. Typical catalysts for the esterification polymerization are protonic acids, Lewis acids, titanium alkoxides, and dialkyltin oxides.

A polymeric polyether or polycaprolactone diol reactant for preparing thermoplastic polyurethanes may be obtained by reacting a diol initiator, e.g., ethylene or propylene glycol, with a lactone or alkylene oxide chain-extension reagent. Lactones that can be ring-opened by an active hydrogen are well-known in the art. Examples of suitable lactones include, without limitation, ϵ-caprolactone, γ-caprolactone, β-butyrolactone, β-propriolactone, γ-butyrolactone, α-methyl-γ-butyrolactone, β-methyl-γ-butyrolactone, γ-valerolactone, δ-valerolactone, γ-decanolactone, δ-decanolactone, γ-nonanoic lactone, γ-octanoic lactone, and combinations of these. In one preferred embodiment, the lactone is ϵ-caprolactone. Useful catalysts include those mentioned above for polyester synthesis. Alternatively, the reaction can be initiated by forming a sodium salt of the hydroxyl group on the molecules that will react with the lactone ring.

In other embodiments, a diol initiator may be reacted with an oxirane-containing compound to produce a polyether diol to be used in the polyurethane polymerization. Alkylene oxide polymer segments include, without limitation, the polymerization products of ethylene oxide, propylene oxide, 1,2-cyclohexene oxide, 1-butene oxide, 2-butene oxide, 1-hexene oxide, tert-butylethylene oxide, phenyl glycidyl ether, 1-decene oxide, isobutylene oxide, cyclopentene oxide, 1-pentene oxide, and combinations of these. The oxirane-containing compound is preferably selected from ethylene oxide, propylene oxide, butylene oxide, tetrahydrofuran, and combinations of these. The alkylene oxide polymerization is typically base-catalyzed. The polymerization may be carried out, for example, by charging the hydroxyl-functional initiator compound and a catalytic amount of caustic, such as potassium hydroxide, sodium methoxide, or potassium tert-butoxide, and adding the alkylene oxide at a sufficient rate to keep the monomer available for reaction. Two or more different alkylene oxide monomers may be randomly copolymerized by coincidental addition or polymerized in blocks by sequential addition. Homopolymers or copolymers of ethylene oxide or propylene oxide are preferred. Tetrahydrofuran may be polymerized by a cationic ring-opening reaction using such counterions as $SbF_6^-$, $AsF_6^-$, $PF_6^-$, $SbCl_6^-$, $BF_4^-$, $CF_3SO_3^-$, $FSO_3^-$, and $ClO_4^-$. Initiation is by formation of a tertiary oxonium ion. The polytetrahydrofuran segment can be prepared as a “living polymer” and terminated by reaction with the hydroxyl group of a diol such as any of those mentioned above. Polytetrahydrofuran is also known as polytetramethylene ether glycol (PTMEG). Preferred chain-extension reagents in making a polymeric polyether or polycaprolactone diol reactant are epsilon-caprolactone and tetrahydrofuran.

Aliphatic polycarbonate diols that may be used in making a thermoplastic polyurethane elastomer are prepared by the reaction of diols with dialkyl carbonates (such as diethyl carbonate), diphenyl carbonate, or dioxolanones (such as cyclic carbonates having five- and six-member rings) in the presence of catalysts like alkali metal, tin catalysts, or titanium compounds. Useful diols include, without limitation, any of those already mentioned. Aromatic polycarbonates are usually prepared from reaction of bisphenols, e.g., bisphenol A, with phosgene or diphenyl carbonate. Aliphatic polycarbonates may be preferred for a higher resistance to yellowing.

In various embodiments, the polymeric diol preferably has a weight average molecular weight of at least about 500, more preferably at least about 1000, and even more preferably at least about 1800 and a weight average molecular weight of up to about 10,000, but polymeric diols having weight average molecular weights of up to about 5000, especially up to about 4000, may also be preferred. The polymeric diol advantageously has a weight average molecular weight in the range from about 500 to about 10,000, preferably from about 1000 to about 5000, and more preferably from about 1500 to about 4000. The weight average molecular weights may be determined by ASTM D-4274.

The synthesis of an elastomeric polyurethane may be carried out by reacting one or more of the above polymeric diols, one or more compounds having at least two isocyanate groups such as the diisocyanates and polyisocyanates already mentioned, and, optionally, one or more chain extension agents. To make a thermoplastic elastomeric polyurethane, the polyisocyanate component, polymeric diol, and chain extension agents are preferably substantially difunctional.

Useful active hydrogen-containing chain extension agents generally contain at least two active hydrogen groups, for example, diols, dithiols, diamines, or compounds having a mixture of hydroxyl, thiol, and amine groups, such as alkanolamines, aminoalkyl mercaptans, and hydroxyalkyl mercaptans, among others. The molecular weight of the chain extenders preferably range from about 60 to about 400. Alcohols and amines are preferred. Examples of useful diols include those diols already mentioned. Suitable diamine extenders include, without limitation, ethylene diamine, diethylene triamine, triethylene tetraamine, and combinations of these. Other typical chain extenders are amino alcohols such as ethanolamine, propanolamine, butanolamine, and combinations of these. The dithiol and diamine reactants may also be included in preparing polyurethanes that are not elastomeric.

In addition to difunctional extenders, a small amount of a trifunctional extender such as trimethylol propane, 1,2,6-hexanetriol and glycerol, or monofunctional active hydrogen compounds such as butanol or dimethyl amine, may also be present. The amount of trifunctional extender or monofunctional compound employed may be, for example, 5.0 equivalent percent or less based on the total weight of the reaction product and active hydrogen containing groups employed when preparing a thermoplastic polyurethane.

The polyurethane may be bio-based, for example as disclosed in U.S. Pat. No. 8,217,193, US Patent Application Publication No. 2008/0103340, US Patent Application Publication No. 2011/0155960, US Patent Application Publication No. 2010/0168371, US Patent Application Publication No. 2008/0081898, and PCT Publication WO08/022,287, all of which are incorporated herein by reference in their entireties.

The reaction of the polyisocyanate, polymeric diol (if making an elastomeric polyurethane), and polyol or other chain extension agent is typically carried out at an elevated temperature in the presence of a catalyst. Typical catalysts for this reaction include organotin catalysts such as stannous octoate, dibutyl tin dilaurate, dibutyl tin diacetate, dibutyl tin oxide, tertiary amines, zinc salts, and manganese salts. Generally, for elastomeric polyurethanes, the ratio of polymeric diol, such as polyester diol, to extender can be varied within a relatively wide range depending largely on the desired hardness of the final polyurethane elastomer. For example, the equivalent proportion of polyester diol to extender may be within the range of 1:0 to 1:12 and, more preferably, from 1:1 to 1:8. Preferably, the diisocyanate(s) employed are proportioned such that the overall ratio of equivalents of isocyanate to equivalents of active hydrogen containing materials is within the range of 0.95:1 to 1.10:1, and more preferably, 0.98:1 to 1.04:1. The polymeric diol segments may typically be from about 35% to about 65% by weight of the polyurethane polymer, and preferably from about 35% to about 50% by weight of the polyurethane polymer.

Blends of polyurethanes may be used.

In various embodiments, the pigmented coating layer or clear coating layer may include one or more thermoplastic or thermoset polyureas. Suitable polyureas may be prepared by reaction of one or more polyamines with one or more of the polyisocyanates already mentioned. Nonlimiting examples of suitable polyamines include diamines such as ethylene diamine, 1,3-propylene diamine, 2-methyl-pentamethylene diamine, hexamethylene diamine, 2,2,4- and 2,4,4-trimethyl-1,6-hexane diamine, imino-bis(propylamine), imido-bis(propylamine), N-(3-aminopropyl)-N-methyl-1,3-propanediamine), 1,4-bis(3-aminopropoxy)butane, diethyleneglycol-di(aminopropyl)ether), 1-methyl-2,6-diamino-cyclohexane, 1,4-diamino-cyclohexane, poly(oxyethylene-oxypropylene)diamines, 1,3- or 1,4-bis(methylamino)-cyclohexane, isophorone diamine, 1,2- or 1,4-bis (sec-butylamino)-cyclohexane, N,N'-diisopropyl-isophorone diamine, 4,4'-diamino-dicyclohexylmethane, 3,3'-dimethyl-4,4'-diamino-dicyclohexylmethane, N,N'-dialkylamino-dicyclohexylmethane, polyoxyethylene diamines, 3,3'-diethyl-5,5'-dimethyl-4,4'-diamino-dicyclohexylmethane, polyoxypropylene diamines, polytetramethylene ether diamines, 3,3',5,5'-tetraethyl-4,4'-diamino-dicyclohexylmethane (i.e., 4,4'-methylene-bis(2,6-diethylaminocyclohexane)), 4,4'-bis(sec-butylamino)-dicyclohexylmethane; triamines such as diethylene triamine, dipropylene triamine, (propylene oxide)-based triamines (i.e., polyoxypropylene triamines), N-(2-aminoethyl)-1,3-propylenediamine, glycerin-based triamines, tetramines such as N,N'-bis(3-aminopropyl)ethylene diamine, triethylene tetramine; unsaturated diamines such as 4,4'-diamino-diphenylmethane (i.e., 4,4'-methylene-dianiline or "MDA"). Aromatic amines are not preferred because of a greater tendency to yellow. The amine- and hydroxyl-functional extenders already mentioned may be used as well. Generally, as before, trifunctional reactants are limited unless a thermoset polymer is desired.

In various embodiments, the pigmented coating layer or clear coating layer may include one or more polyamides. Suitable polyamides may be obtained by: (1) polycondensation of (a) a dicarboxylic acid, such as oxalic acid, adipic acid, sebacic acid, terephthalic acid, isophthalic acid, 1,4-cyclohexanedicarboxylic acid, or any of the other dicarboxylic acids already mentioned with (b) a diamine, such as ethylenediamine, tetramethylenediamine, pentamethylenediamine, hexamethylenediamine, or decamethylenediamine, 1,4-cyclohexanediamine, m-xylylenediamine, or any of the other diamines already mentioned; (2) a ring-opening polymerization of a cyclic lactam, such as ϵ-caprolactam or ω-laurolactam; (3) polycondensation of an aminocarboxylic acid, such as 6-aminocaproic acid, 9-aminononanoic acid, 11-aminoundecanoic acid, or 12-aminododecanoic acid; or (4) copolymerization of a cyclic lactam with a dicarboxylic acid and a diamine. Polymerization may be carried out, for example, at temperatures of from about 180° C. to about 300° C. Specific examples of suitable polyamides include NYLON 6, NYLON 66, NYLON 610, NYLON 11, NYLON 12, copolymerized NYLON, NYLON MXD6, and NYLON 46. Thermoplastic elastomer amides, such as polyether-block-amides, may be used. Polyether-block-amides may be formed by esterifying dicarboxylic acid-terminated amides with polyoxyalkylene glycols. If a thermoset polyamide is desired, the reactants include a sufficient amount of trifunctional or higher reactants.

The pigmented coating layer or clear coating layer may include any combination of the polyurethane, polyurea, and polyamide polymers themselves and any blends and copolymers of these with one another or with other copolymerized polymer blocks. The pigmented coating layer or clear coating layer may also include any thermoset materials prepared from any of these.

In various embodiments, the pigmented coating layer includes one or more of polyurethanes, polyureas, and polyamides and is dyed with the acid dye. The pigmented coating layer may include another resin in addition to the polyurethane, polyurea, or polyamide such as, for example polyester resin, as long as such resins are compatible with the polyurethane, polyurea, or polyamide and do not prevent the pigmented coating layer from being dyed. The pigmented coating layer preferably includes 50 percent by weight or more, preferably 60 percent by weight or more, or 70 percent by weight or more of the polyurethane, polyurea, or polyamide or some combination of more than one polyurethane, polyurea, and polyamide resin.

The pigmented coating layer includes a pigment, such as a yellow or white pigment, and in particular a white pigment such as titanium dioxide or zinc oxide, an aluminum pigment, or a white pearlescent pigment such as titanium dioxide-coated mica pigments. White, silver metallic, and white pearl colors provide dyed second colors that are truest to the dye selected, but other first colors, particularly light colors such as a light yellow, can be used to create a different color with the dye. Generally, dark or intense first colors are avoided, but pigments of many colors may be used to provide light colors or for tinting, and special effect pigments may also be used as desired. Examples of other pigments that could be used include inorganic pigment such as red iron oxide, transparent red iron oxide, chromium oxide green, ferric ammonium ferrocyanide (Prussian blue), and ultramarine; organic pigments such as metallized and non-metallized azo reds, quinacridone reds and violets, perylene reds, copper phthalocyanine blues and greens, carbazole violet, monoarylide and diarylide yellows, benzimidazolone yellows, tolyl orange, and naphthol orange and fluorescent or phosphorescent pigments such as zinc sulfide, cadmium sulfide, and metal aluminate phosphorescent pigments. The pigmented coating layer may also include one or more particulate fillers such as barium sulfate, talc (magnesium silicate), zinc oxide, titanium dioxide (anatase or rutile), lithopone, calcium carbonate, antimony oxide, and silica. The pigments or fillers can be introduced by first forming pigment base with a dispersing resin by conventional techniques, such as sandgrinding, ball-milling, attritor grinding, two roll milling to disperse the pigments. Generally titanium dioxide is used as a white pigment, for example in amounts of from about 25 parts by weight to about 45 parts by weight based on the total binder weight. "Binder" refers to the film-forming components of the coating layer. In various embodiments, a white-colored pigmented coating layer may be tinted with a small amount of blue pigment or brightener.

Metallic pigmented coating layers are produced using one or more special flake pigments. Metallic colors are generally defined as colors having gonioapparent effects. For example, the American Society of Testing Methods (ASTM) document F284 defines metallic as "pertaining to the appearance of a gonioapparent material containing metal flake." Metallic coating layer colors may be produced using metallic flake pigments like aluminum flake pigments, copper flake pigments, zinc flake pigments, stainless steel flake pigments, and bronze flake pigments or using pearlescent flake pigments including treated micas like titanium dioxide-coated mica pigments and iron oxide-coated mica pigments or calcium aluminum borosilicate, silicon dioxide, or aluminum oxide flakes coated with metal oxide such as titanium or iron oxides and other such reflective pigments. These flake pigments give the coatings a different appearance when viewed at different angles to produce a sparkle effect. The metal flake pigments such as aluminum pigment may be surface-treated if they are used in a waterbased coating composition. The flake pigments may be included in the pigmented coating layer in an amount of at least about 0.1% or at least about 0.5 parts by weight or at least about 1 parts by weight or at least about 2 parts by weight and up to about 10 parts by weight or up to about 15 parts by weight or up to about 20 parts by weight, based on the total binder weight. "Binder" refers to the film-forming components of the coating layer. In preferred embodiments an aluminum pigment or white pearlescent pigment is used.

Unlike the solid color pigments, the flake pigments do not agglomerate and are not ground under high shear because high shear would break or bend the flakes or their crystalline morphology, diminishing or destroying the gonioapparent effects. The flake pigments are satisfactorily dispersed, preferably with any binder resin, such as the polyurethane, polyurea, or polyamide, a polyester resin, a polyether such as PTMEG, a vinyl or acrylic polymer, a cellulose material, or a crosslinker, by stirring under low shear. Rheology control additives or low solids coating compositions may help the flakes to orient parallel to the face of the film during application of these coating compositions for optimum gonioapparent effect.

The pigmented coating composition or the clear coating composition used to form those layers may also contain one or more customary additives such as dispersants, hindered amine light stabilizers such as piperidines and oxanalides, ultraviolet light absorbers such as benzotriazoles, triazines, and hindered phenols, antioxidants such as phenols, phosphites, and hydrazides, plasticizers, defoaming agents, processing aids, surfactants, fluorescent materials and fluorescent brighteners, and so on. Generally, the additives will be present in the composition in an amount of up to about 10 weight percent based on the total weight of the composition depending upon the desired properties.

Typically, the pigmented coating layer and, if used, the clear coating layer may each have a thickness of from about 5 μm to about 100 μm. In various embodiments, the coating layer may be from about 5 μm or about 10 μm or about 15 μm to about 100 μm or about 75 μm or about 50 μm or about 25 μm or about 20 μm thick.

In addition to having a pigmented coating layer and, optionally, a clear coating layer, the golf ball may have any known construction. Examples include a two-piece golf ball comprising a single core and a cover around the core; a three-piece ball comprising a core, an intermediate layer (or mantle), and an outer cover layer; or a multi-layer golf ball comprising more than layer between core and cover. The pigmented coating layer is applied over the cover, and, if used, the clear coating layer is applied over the pigmented coating layer. In each case the pigmented coating layer or a clear coating layer or both will comprise one of the polyurethane, polyurea, and polyamide polymers, blends, copolymers, or thermoset products of these.

The golf balls of the invention may be formed using a variety of techniques such as compression molding, thermoforming, injection molding including retractable pin injection molding, reaction injection molding (RIM), and liquid injection molding (LIM), casting, vacuum forming, powder coating, flow coating, spin coating, dipping, spraying, and so on depending on the materials used for a specific component. For example, casting, RIM, or LIM may be preferred when the material is thermoset, whereas compression molding or injection molding may be preferred for liquid compositions or thermoplastic precursors. An of these methods may be used in preparing a core (unitary or with outer layers), which may be covered with a dimpled cover layer formed by injection molding, compression molding, casting, vacuum forming, powder coating, injection molding, and so on. For example, when the cover is formed by injection molding, a core fabricated beforehand may be set inside a mold, and the cover material may be injected into the mold. Reaction injection molding may be used to provide a thermoset cover. Alternatively, another method that may be used involves pre-molding a pair of half-covers from the cover material by die casting or another molding method, enclosing the core in the half-covers, and compression-molding at, for example, between 120° C. and 170° C. for a period of 1 to 5 minutes to attach the cover halves around the core. In another method, the cover composition may be cast about the core. The cast cover is preferably cured in a closed mold. The casting process may be performed under nitrogen. A first half of the cover may be formed in a mold over the core, then a second half of the cover assembled to the first half and cured to form a finished cover. The surface of the core may be surface-treated before the cover is formed over it to increase the adhesion between the core and the cover. The cover typically has a dimple pattern and profile to provide desirable aerodynamic characteristics to the golf ball.

The core of the golf ball may be solid, semi-solid (e.g., paste or gel), hollow, or filled with a fluid or powder in a one-piece or multi-piece construction. As used in describing the core, a fluid may be a liquid, paste, gel, gas, or some combination of these. Nonlimiting examples of suitable core materials include thermoset elastomers, thermoplastic elastomers, and ionomers. Nonlimiting examples of elastomers include natural rubber and synthetic rubbers such as styrene butadiene rubber, polybutadiene rubber, polyisoprene rubber, styrene-butadiene rubber (SBR), and ethylene-propylene-diene terpolymer (EPDM). High cis-polybutadiene (at least 40%, preferably at least 70%, and more preferably at least 90% cis-1,4 bond) crosslinked with a diacrylate such as zinc diacrylate is one preferred rubber. Examples of thermoplastic materials include thermoplastic polyurethanes, including thermoplastic polyurethane elastomers, polyamides, polyesters, and other thermoplastic elastomers. The core may also be made of a highly-neutralized ionomer composition, particularly a metal salt of a random copolymer of an olefin, especially ethylene, and an ethylenically unsaturated acid, such as acrylic acid or methacrylic acid, optionally along with an ester of an ethylenically unsaturated acid, such as an alkyl acrylate. The ionomer resin may be neutralized to any degree. In some embodiments, the ionomer resin may be neutralized at least about 20%, or at least about 40% or at least about 70%, or at least 90%, and up to or nearly 100% with an alkali or alkaline earth metal such as sodium or magnesium. The ionomer resin composition may further include a metal salted C1-C36 monocarboxylic acid. Suitable ionomer resins are disclosed, for example in U.S. Pat. Nos. 5,179,168, 5,580,927, 6,100,321; 6,777,472; 6,653,383; 6,815,480; 6,953,820; and 7,375,151, all assigned to DuPont, all of which are incorporated herein by reference.

The golf ball may have a multi-layer core where the innermost core section and the mantle layer or each succeeding layer extending outwardly from it is prepared from one of the materials already mentioned as useful for the core or from other materials, a wound layer formed with tensioned thread material of inorganic (e.g., glass, carbon) or organic (e.g., block copolymer, polyester, crosslinked cis-polyisoprene) fibers. Each layer may be include fillers such as those already mentioned or other customary additives.

The core may be surface treated before the cover is applied Nonlimiting examples of suitable surface preparations include mechanically or chemically abrasion, corona discharge, plasma treatment, or application of an adhesion promoter such as a silane.

In one embodiment, the golf ball cover includes a polyurethane such as any of those already described. One preferred polyurethane may be prepared by reacting a mixture comprising PTMEG, 1,4 butanediol, and 4,4' diphenylmethane diisocyanate (MDI). In addition to or instead of a polyurethane, the cover may include other polymers, such as polyesters or thermopastic elastomers, for example polyester or styrene-block copolymer thermoplastic elastomers, In other embodiments, the cover may include an ionomer resin. Examples of ionomer resin that may be used include copolymers of ethylene, an α,β-ethylenically unsaturated acid having 3 to 8 carbon atoms, and optionally an ester of an α,β-ethylenically unsaturated acid having 3 to 8 carbon atoms that are at least partially neutralized with a metal ion. Examples of the ethylenically unsaturated acid include acrylic acid, methacrylic acid, crotonic acid, fumaric acid, and maleic acid; in particular, acrylic acid and methacrylic acid may be preferred. Examples of the α,β-ethylenically unsaturated esters include the methyl, ethyl, propyl, isopropyl, butyl, isobutyl, tert-butyl, amyl, and hexyl esters of acrylic acid, methacrylic acid, crotonic acid, fumaric acid, and maleic acid; in particular, acrylates and methacylates are useful. The neutralizing metal ion may be, for example, monovalent metal ions such as sodium, potassium, and lithium ions; divalent earth metal ions such as magnesium, calcium, zinc, and barium; and other metal ions such as aluminum, zirconium, and tin, with sodium, zinc, and magnesium ions being among those preferred.

The cover may be formulated with a pigment, such as those already mentioned. The cover is typically pigmented with a white pigment such as titanium dioxide or zinc oxide. Generally titanium dioxide is used as a white pigment, for example in amounts of from about 0.5 parts by weight or 1 part by weight to about 8 parts by weight or 10 parts by weight passed on 100 parts by weight of resin. In various embodiments, a white-colored cover may be tinted with a small amount of blue pigment or brightener.

The cover may also contain one or more customary additives such as fillers, dispersants, hindered amine light stabilizers such as piperidines and oxanalides, ultraviolet light absorbers such as benzotriazoles, triazines, and hindered phenols, antioxidants such as phenols, phosphites, and hydrazides, plasticizers, processing aids, surfactants, fluorescent materials and fluorescent brighteners, and so on. Examples of suitable inorganic fillers include zinc oxide, zinc sulfate, barium carbonate, barium sulfate, calcium oxide, calcium carbonate, clay, tungsten, tungsten carbide, tin oxide, zinc carbonate, silica, talc, clays, glass fibers, and natural fibrous minerals. Suitable organic fillers may include melamine colophony, cellulose fibers, polyamide fibers, polyacrylonitrile fibers, polyurethane fibers, or polyester fibers. Polymeric, ceramic, metal, and glass microspheres also may be used. Combinations of any of these may be used. Fillers may be used to adjust the specific gravity, modulus, and other physical properties of the cover. The total amount of the filler may be from about 0.5 to about 30 percent by weight of the polymer components. Wetting or dispersing additives may be used to more effectively disperse the pigments and particulate fillers. Generally, the additives will be present in the cover in an amount between about 1 and about 70 weight percent based on the total weight of the composition depending upon the desired properties.

The golf ball can be manufactured so as to conform with the Rules of Golf for competitive play with a ball diameter which is of a size that will not pass through a ring having an inside diameter of 42.672 mm, but is not more than 42.80 mm, and to a weight of generally from 45.0 to 45.93 g.

Figure 2:
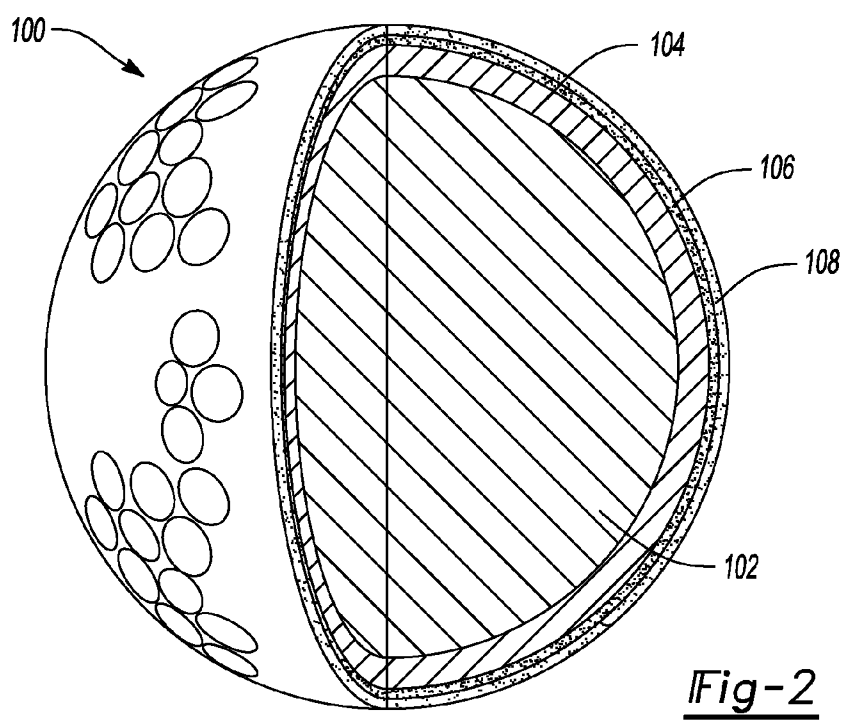
FIG. 2 illustrates a second embodiment of a golf ball that is dyed.

An example of a golf ball as described that may be dyed by the disclosed methods is shown in FIG. 1. In the FIG. 1, golf ball 100 has a core 102, a cover 104 and a pigmented coating layer 106. FIG. 2 shows a golf ball in which a clear coating layer 108 is applied to the surface of the pigmented coating layer 106.

A pigmented coating layer 106 and clear coating layer 108 including the polyurethane, polyamide, or polyurea may be made and applied to the cover in various ways. In a first variation, the isocyanate-functional reactants and the hydroxyl-functional reactants or amine-functional reactants are combined only shortly prior to application in a two-pack (or two-part or two-component or 2K) coating method in which the reactants react to form the polyurethane or polyurea in the applied coating layer in curing the coating. A polyamide coating may be made similarly with an amine-functional resin in one coating pack and a polyisocyanate crosslinker in a second coating pack. In a second variation, the reactants are reacted to form a thermoplastic polymer, which may be formulated into a solventborne or waterborne coating composition with other components. Generally, lower molecular weight polymers are formulated into a coating that includes a crosslinker for the polymer. If the coating composition is formulated with a crosslinker, then the applied coating is cured after application; typically, this is done by heating or baking the applied coating to a crosslinked coating layer on the ball. In a third variation, the coating is made by preparing an isocyanate-functional polyurethane or polyurea prepolymer, then dispersing the prepolymer in water in the presence of a diamine extender to form a high molecular weight, linear or slightly branched polyurethane or polyurea in aqueous dispersion. A coating prepared with the high molecular weight polymer may optionally include a crosslinker and be crosslinked after application of the pigmented coating layer to the cover.

In the case of a two-component coating, either component or both components can contain catalyst, solvents, and other reactants or binder components and additives such as those just recited.

The pigmented or clear coating composition (or, in the case of a two-component coating composition, each component used in making the pigmented or clear coating) may be produced by mixing and homogenizing the various constituents using typical and known mixing methods and apparatus such as stirred tanks, agitator mills, Ultraturrax, inline dissolvers, static mixers, micromixers, toothed-wheeled dispersers, microfluidizers, or other such suitable equipment.

The coating composition can be applied to the golf ball cover by various methods, such as by spraying, brushing, dipping, rolling, roller coating, flow coating, laminating, or injection backmolding. The particular application method will depend on the coating formulation, as well-known in the coatings art. If the coating composition contains solvent (whether organic or water), the solvent evaporates in forming a coating layer on the golf ball. The applied coating layer may be heated, for example to temperatures from about 150° F. to about 200° F. (about 65.6° C. to about 93.3° C.) to facilitate solvent evaporation or, in the case of a thermosetting coating, to also cure the binder.

Depending on the composition of the cover, the cover may usefully be prepared to accept the coating layer by application of a primer or adhesion promoter to its surface or by treating its surface with a plasma pretreatment, corona pretreatment, UV irradiation treatment, and electron beam irradiation treatment or flame pretreatment, by sanding, or by otherwise mechanically abrading the surface of the cover.

In various embodiments, a partial clear coating layer may be applied, for example by masking a portion of the pigmented coating layer with a masking material that prevents the clear coating from being applied to the masked portion of the pigmented coating layer. After application of the clear coating, for example by spraying, brushing, dipping, rolling, or roller coating, the masking material is removed and the partial clear coating layer is dried or cured as needed. In another embodiment, a partial clear coating layer is applied to the pigmented coating layer by a printing process.

The golf ball may be pre-washed to remove any dirt, oil, or other surface contaminants before being dyed by any suitable means. In one example, the golf ball may be washed in a solvent or aqueous wash, such as aqueous isopropanol, which may be heated for example to 40° to 70° C.

The golf ball may be dyed by a process that includes contacting the golf ball with the aqueous dye solution, for example by immersing the golf ball partially or fully in the aqueous dye solution or by applying the aqueous dye solution to the golf ball, for a time sufficient for the anionic or nonionic disperse dye compound to color the golf ball. The aqueous dye solution may be applied to the golf ball via a spray or printing process. It is generally observed that, all other things being equal, a polyurethane, polyurea, or polyamide with lower hardness takes a dye more readily than one with higher hardness.

Elevated temperature may aid dyeing by solubilizing the dye and increasing dye diffusion into the pigmented coating layer or clear coating layer. In certain embodiments, the golf ball is dyed in a dye solution at a temperature of from ambient up to about 80° C., or preferably from about 20° C. to about 60° C., or more preferably from about 40° to about 70° C. or from about 30° to about 60° C.

The acid or nonionic disperse dye solution is kept in contact with the golf ball for a period of time sufficient to dye the pigmented coating layer or clear coating layer to a desired degree of coloration. In some embodiments, the acid or nonionic disperse dye solution is kept in contact with the golf ball for up to about 15 minutes or from about 1 minute or about 2 minutes to about 10 minutes or about 5 minutes.

In a first method, the pigmented coating layer includes the polyurethane, polyurea, or polyamide and is dyed to a second color. The golf ball has no clear coating layer on the pigmented coating layer.

In a second method, the pigmented coating layer includes the polyurethane, polyurea, or polyamide and is dyed to a second color, and the golf ball has no clear coating layer during the dyeing. After the pigmented coating layer is dyed, a clear coating is applied over the dyed pigmented coating layer, for example to provide a glossy finish to the ball.

In third method, the pigmented coating layer is dyed as before to a second color, and a clear coating layer containing a polyurethane, polyurea, or polyamide is applied over only a portion but less than all of the dyed pigmented coating layer, then the applied coating is dyed a third color different from the first and second colors. The portion or portions of the ball without the clear coating layer may be masked to prevent color change by contact with the acid or nonionic disperse dye used to dye the clear coating. A partial clear coating layer may be applied by pad printing or other printing methods or by masking areas of the pigmented coating layer that are not to receive the coating (e.g., with a wax or impervious template temporarily adhered to the ball) before applying the clear coating to the pigmented coating layer, for example by spraying or dip coating.

In various embodiments of each of the first through third methods, less than all of the pigmented coating layer may be dyed the second color, for example by only contacting part of the pigmented coating layer with the anionic or nonionic disperse dye or by masking a part of the pigmented coating layer before contacting the pigmented coating layer with the anionic dye so as to shield the masked part from being dyed.

In a fourth method, a clear coating layer on the pigmented coating layer includes the polyurethane, polyurea, or polyamide and the clear coating layer is dyed to a second color. The pigmented coating layer is not dyed.

In a fifth method, a clear coating layer on the pigmented coating layer includes the polyurethane, polyurea, or polyamide and the clear coating layer is dyed to a second color. The pigmented coating layer also include a polyurethane, polyurea, or polyamide and is also dyed to the second color by contacting the ball with the anionic or nonionic disperse dye solution for time sufficient for the dye to enter both the clear coating layer and to enter at least partially into the pigmented coating layer.

In various embodiments of the fourth and fifth methods, less than all of the clear coating layer may be dyed the second color, for example by only contacting part of the clear coating layer with the anionic or nonionic disperse dye or by masking a part of the clear coating layer before contacting the clear coating layer with the anionic dye so as to shield the masked part from being dyed.

In a sixth method, the pigmented coating layer is not dyed and does not contain a polyurethane, polyurea, or polyamide. A partial layer of a clear coating layer containing the polyurethane, polyurea, or polyamide is applied on the pigmented coating layer by pad printing or other printing methods or by masking areas of the pigmented coating layer that are not to receive the coating (e.g., with a wax or impervious template temporarily adhered to the ball) before applying the clear coating to the pigmented coating layer. The applied clear coating portions are then dyed with the anionic or nonionic disperse dye. The pigmented coating layer is not dyed by the anionic or nonionic disperse dye.

The invention is further described in the following examples. The example is merely illustrative and does not in any way limit the scope of the invention as described and claimed. All parts are parts by weight unless otherwise noted.

EXAMPLES

General procedures for preparing dye solutions for dyeing the coated golf balls are as follow. A pre-determined amount of dye is added to deionized water and alcohol mixture. The dye is dissolved by heating the solution to a temperature of from about 40° C. to about 70° C. with agitation. Upon dissolution, an ammonium salt is added either as a solid or in the form of a concentrated aqueous solution. A golf ball having a white, thermoplastic polyurethane cover is pre-washed by washing the ball for about 5 minutes in a mixture of 60% by volume of n-propanol and 40% by volume deionized water, which may be heated to a temperature up to 70° C., then drying the ball. After the desired temperature of the dye solution is reached, the pre-washed golf ball is placed in the dye bath for from about 2 to about 10 minutes. The dye solution temperature and the dye time can be adjusted to obtain a desired color intensity. The dyed golf ball is removed, rinsed with tap water or a solution of up to 20% n-propanol with tap or deionized water, and dried by air.

Typical dye solutions are composed of 15% by weight of n-propanol and 85% by weight of DI water but could contain a higher concentration of n-propanol. Into the n-propanol/water solution are added powdered dye and TBAC (tetra-butyl ammonium chloride) in a ratio of 1 or 2 parts dye to 1 part TBAC. Nonionic dyes require no TBAC (luminous yellow for instance).

Example 1

A dye solution was prepared by dissolving Luminous Yellow 8G FF (obtained from Zenith Chemical Industries Limited) at a concentration of 0.2 g/liter in a solution of 75% by weight deionized water and 25% by weight n-propanol to produce a dye solution.

The following golf balls are dyed in the Luminous Yellow dye solution: (1) a golf ball with a silver metallic coating layer on the cover and a clear polyurethane coating layer over the silver metallic coating layer; (2) a golf ball as described in (1), but with a polyurethane-based silver metallic coating layer; and (3) a golf ball with a polyurethane-based white pearl coating layer and a clear polyurethane coating layer over the white pearl coating layer.

The golf balls are first washed for three minutes at 40° C. in an aqueous isopropanol wash, then dried. The golf balls are dyed by immersing them for 10 minutes in the dye solution heated to 60° C. The dyed balls have a rich metallic color.

The foregoing description of the embodiments has been provided for purposes of illustration and description. It is not intended to be exhaustive or to limit the invention. Individual elements or features of a particular embodiment are generally not limited to that particular embodiment, but can be used in other embodiments and can be combined in other ways, even if not specifically shown or described. Such variations are included in the invention.

What is claimed is:

1. A method of dyeing a golf ball from a first color to a different color, comprising:

providing a golf ball comprising a pigmented coating layer of a first color, the pigmented coating layer including a polyurethane; and then:

immersing the golf ball in an aqueous solution for a time sufficient to dye the pigmented coating layer to a second color different from the first color; wherein the aqueous solution consists essentially of: an anionic dye; a quaternary ammonium compound selected from soluble tetrabutylammonium compounds or soluble tetrahexylammonium compounds; water; and from about 1% by volume to about 50% by volume of a water-soluble organic solvent selected from the group consisting of methanol, ethanol, n-propanol, acetone, methyl ethyl ketone, butyl acetate, and combinations thereof.

2. A method according to claim 1, wherein the first color is white, silver metallic, or white pearl.

3. A method according to claim 1, wherein the golf ball does not have a clear coating layer.

4. A method according to claim 3, wherein a portion less than all of the pigmented coating layer is dyed.

5. A method according to claim 4, further wherein the portion is masked and an undyed portion of the pigmented coating layer is dyed.

6. A method according to claim 3, further comprising applying a clear coating over the dyed pigmented coating layer.

7. A method according to claim 1, wherein the golf ball further comprises a clear coating layer over the pigmented coating layer, wherein the clear coating layer comprises a member selected from the group consisting of polyurethanes, polyureas, polyamides, and combinations thereof and is also dyed in the immersing step.

8. A method according to claim 7, wherein a portion less than all of the clear coating layer is dyed.

9. A method according to claim 8, wherein the portion is masked and an undyed portion of the clear coating layer is dyed.

10. A method according to claim 6, wherein the clear coating layer is applied by a printing process.

11. A method according to claim 1, wherein the solution comprises from about 0.001 to about 5.0 g/L of the dye compound.

12. A method according to claim 7, wherein the member is at least one of a polyester-polyurethane or a polyether-polyurethane.

13. A method according to claim 1, wherein the golf ball further comprises a clear coating layer over the pigmented coating layer.

14. A method of dyeing a golf ball from a first color to a different color, comprising:

providing a golf ball comprising a pigmented coating layer of a first color, the pigmented coating layer including a polyurethane; and then:

immersing the golf ball in an aqueous dye solution for a time sufficient to dye the pigmented coating layer to a second color different from the first color; wherein the aqueous dye solution consists essentially of: an acid dye compound; a quaternary ammonium compound selected from soluble tetrabutylammonium compounds; and from about 1% by volume to about 50% by volume of a water-soluble organic solvent.

15. A method according to claim 14, wherein the quaternary ammonium compound comprises a bromide or a chloride.

16. A method according to claim 15, wherein the quaternary ammonium compound comprises a member selected from the group consisting of tetrabutylammonium bromide and tetrabutylammonium chloride.

17. A method according to claim 14, wherein the golf ball does not have a clear coating layer.

18. A method according to claim 14, wherein the golf ball further comprises a clear coating layer over the pigmented coating layer, wherein the clear coating layer comprises a member selected from the group consisting of polyurethanes, polyureas, polyamides, and combinations thereof and is also dyed in the immersing step.

19. A method according to claim 18, wherein a portion less than all of the clear coating layer is dyed.

20. A method according to claim 14, wherein the solution comprises from about 0.001 to about 5.0 g/L of the dye compound.

* * * * *